United States Patent [19]

Light, Jr. et al.

[11] 4,135,701
[45] Jan. 23, 1979

[54] AUTOMATIC FLAME CUTTER FOR MITRES WITH CONSTANT ANGLE BEVELS ON A PIPE

[75] Inventors: Stanley C. Light, Jr., Georgetown, Tex.; Louis J. Privoznik, Newtown Square, Pa.

[73] Assignee: Westinghouse Electric Corp., Pittsburgh, Pa.

[21] Appl. No.: 765,030

[22] Filed: Feb. 2, 1977

[51] Int. Cl.² ............................................. B23K 7/04
[52] U.S. Cl. ........................................ 266/57; 266/58
[58] Field of Search ..................... 219/124, 125 PL; 266/54, 57, 58, 61

[56] References Cited

U.S. PATENT DOCUMENTS

| | | | |
|---|---|---|---|
| 2,384,128 | 9/1945 | Nation | 266/61 X |
| 3,900,346 | 8/1975 | Muller et al. | 266/57 X |
| 3,936,714 | 2/1976 | Marshall et al. | 266/57 X |
| 4,014,495 | 3/1977 | Oda et al. | 266/57 X |

FOREIGN PATENT DOCUMENTS

| | | | |
|---|---|---|---|
| 7607370 | 10/1976 | France | 266/57 |
| 4224814 | 11/1967 | Japan | 219/124 |
| 341615 | 7/1972 | U.S.S.R. | 266/57 |

Primary Examiner—Howard N. Goldberg
Assistant Examiner—Paul A. Bell
Attorney, Agent, or Firm—F. J. Baehr, Jr.

[57] ABSTRACT

A boom carrying a cutting torch is synchronized with a turntable and the torch is mounted to follow an arcuate slide and is synchronized with the turntable to make a mitred cut on the pipe and form a constant angle bevel on the mitered cut.

1 Claim, 3 Drawing Figures

AUTOMATIC FLAME CUTTER FOR MITRES WITH CONSTANT ANGLE BEVELS ON A PIPE

BACKGROUND OF THE INVENTION

This invention relates to automatic pipe cutting apparatus, and more particularly to such apparatus which makes a mitred cut and forms a constant angle bevel on the mitred cut.

To automatically weld two pieces of pipe together requires that the bevel of the joint be uniform. When the pipe is cut at 90° to its longitudinal axis, the production of bevels of a constant angle is relatively simple; however, when the pipe is cut at an angle to form a mitred joint, for example 45°, if the bevel is to be uniform to produce a uniform groove for welding, the angle at which the bevel is cut must vary as the mitred cut follows an elliptical path over the surface of the pipe.

To produce high quality welds, the finish of the bevel is critical and must be of high quality to reduce costly rework. Inconsistency in the bevel can cause defects in subsequently made welds.

Commercial grades of pipe have certain discrepancies including circumferential out-of-roundness or lack of concentricity or differing wall thicknesses, which must be compensated for, if high quality welds are to be produced.

SUMMARY OF THE INVENTION

In general, an automatic flame cutting apparatus for producing mitres having constant angle bevels on pipe, when made in accordance with this invention, comprises a turntable disposed to rotate about its axis and having an imaginary plane generally disposed perpendicular to the axis of rotation, a three-jaw chuck for clamping the pipe on the turntable so that the pipe is disposed with its longitudinal axis generally coaxial with the axis of rotation of the turntable and a boom synchronized with the rotation of the turntable. The boom has an imaginary line disposed thereon generally parallel to the imaginary plane of the turntable. The synchronization is such that the distance between the imaginary line on the boom and the imaginary plane on the turntable varies in such a manner to provide a predetermined distance therebetween for each angular position of the turntable. The flame cutting apparatus further comprises a cutting torch attached to the boom in such a manner that the torch is generally fixed relative to the boom to cut a uniform mitre on the pipe in a first mode of operation and the torch is movably mounted to follow an arcuate path in a second mode of operation. The arcuate position of the torch is synchronized with the angular position of the turntable in the second mode of operation whereby a bevel forming a constant angle with respect to an imaginary plane through the edge of the mitred cut on the pipe will be automatically produced utilizing this apparatus.

BRIEF DESCRIPTION OF THE DRAWINGS

The objects and advantages of this invention will become more apparent from reading the following detailed description in connection with the accompanying drawings, in which corresponding reference characters indicate corresponding portions throughout the drawing and in which.

DESCRIPTION OF THE PREFERRED EMBODIMENT

Figure 1:
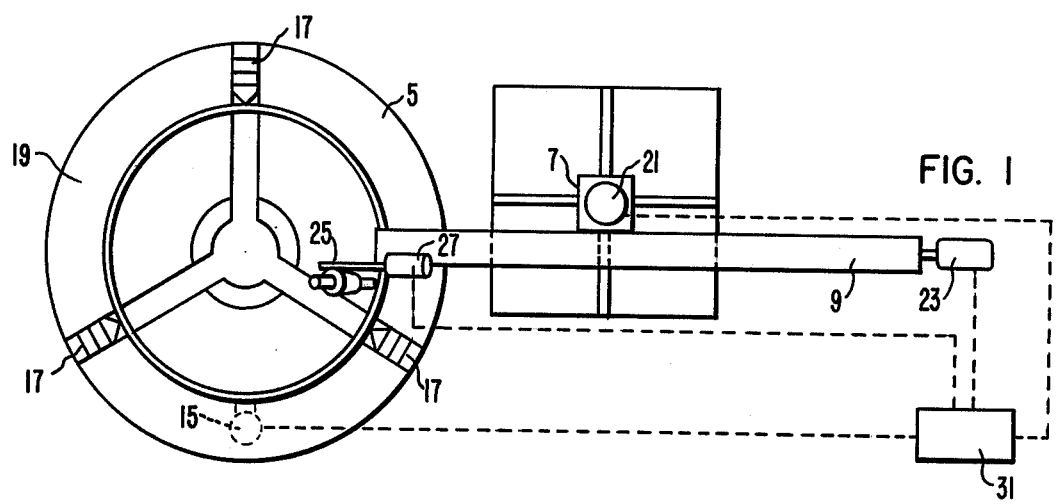
FIG. 1 is an elevational view of an automatic flame cutting apparatus made in accordance with this invention.
Figure 2:
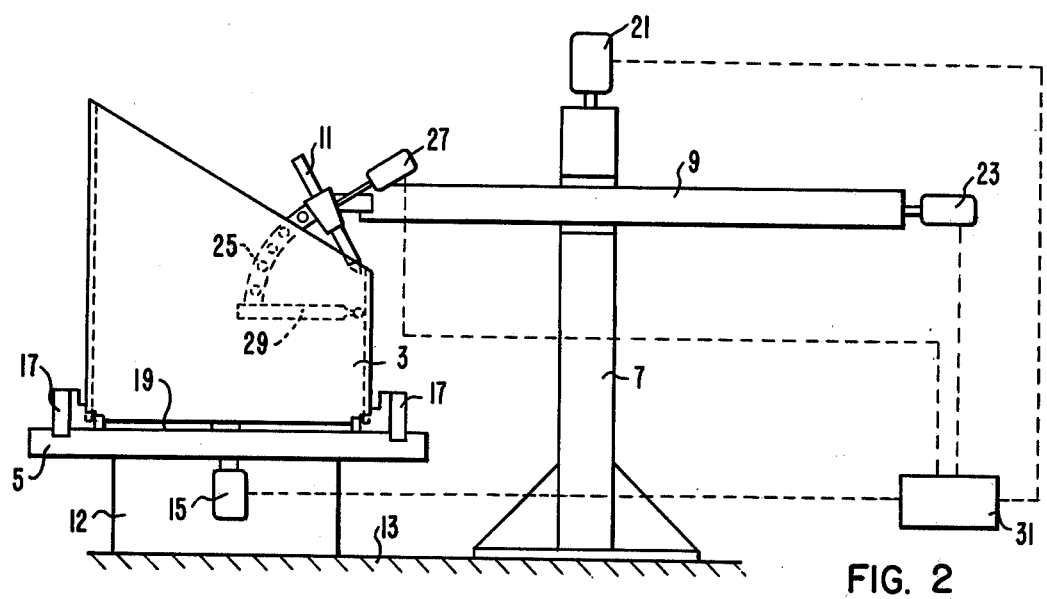
FIG. 2 is a plan view of the flame cutting apparatus shown in FIG. 1.

Referring now to the drawings in detail and in particular to FIGS. 1 and 2, there is shown an apparatus for automatically cutting mitres on pipe 3 and forming constant angle bevels on the mitred cuts. The apparatus 1 comprises a turntable 5 upon which the pipe 3 is mounted and rotated about its longitudinal axis, a manipulator mast 7, disposed adjacent the turntable, a manipulator boom 9 slidably disposed on the manipulator mast 7 so that the boom 9 moves vertically and horizontally with respect to the mast 7 and a cutting torch 11 mounted on one end of the boom 9.

The turntable 5 is mounted on a base 12 which is disposed on a floor or base plate 13 so that the axis of rotation of the turntable 5 is vertically oriented. A variable speed, reversible motor or other drive means 15 is disposed to rotate the turntable 5 at varying speeds and in either direction. A three-jaw chuck 17 or other pipe centering means is disposed on the turntable 5 and the pipe 3 is mounted vertically therein so that the longitudinal axis of the pipe 3 may be rapidly aligned or coaxially disposed with respect to the axis of rotation of the turntable 5. The turntable 5 has a generally horizontal planar surface 19 forming the upper surface thereof.

The manipulator mast 7 is mounted on the floor or base plate 13 and extends generally vertically therefrom adjacent the turntable 5. A variable speed reversible electric motor or other drive means 21 is mounted on the mast 7 raising and lowering or vertically moving the manipulator boom 9.

A variable speed reversible electric motor or other drive means 23 is mounted on the manipulator boom 9 to move it forward and backward or toward or away from the pipe 3 or the axis of the turntable 5.

As is obvious to those skilled in the art, the drive means 21 and 23 could be mounted on either the mast 7 or the boom 9 and numerous mechanisms may be utilized to provide the desired motion, including, but not limited to, drive mechanisms such as racks and pinions, screws, sprockets and chains and other drive mechanisms.

The cutting torch 11 is mounted on an arc slide 25 and a variable speed reversible electric step motor or other drive means 27 is utilized in conjunction with a rack and pinion or other mechanism that causes the cutting torch 11 to traverse the arc slide 25 causing it to follow an arcuate path.

A proximity probe 29 is disposed on the arc slide 25 so as to engage the inside of the pipe 3 responding to out-of-roundness or defects in concentricity of the inner surface of the pipe 3.

A controller 31 incorporating electronic digital programs utilizing etched cards or other control means responds to the angular position of the turntable 5 to control the speed of the turntable 5, the position and speed of travel of the boom 9 up or down and in or out and the arcuate position and speed of the cutting torch 11. The boom 9 is synchronized with the turntable 5 so that for each angular position of the turntable 5 an imaginary plane perpendicular to the axis of rotation of the turntable is a predetermined distance from an imaginary line on the boom 9 parallel to the plane on the turntable 5. The cutting torch 11 is set in a generally horizontal position on the outside of the pipe to cut the mitre in the pipe. Magnetic hold bars or other means are utilized to hold the two pieces of pipe together during this mode of the cutting operation. The cutting torch is synchronized with the turntable so that its angular position on the arc slide 25 is moved to a predetermined position for each angular position of the turntable when cutting a bevel on the mitred pipe and cuts from the inside to the outside of the pipe in the bevel cutting mode as shown in FIGS. 1 and 2.

Figure 3:
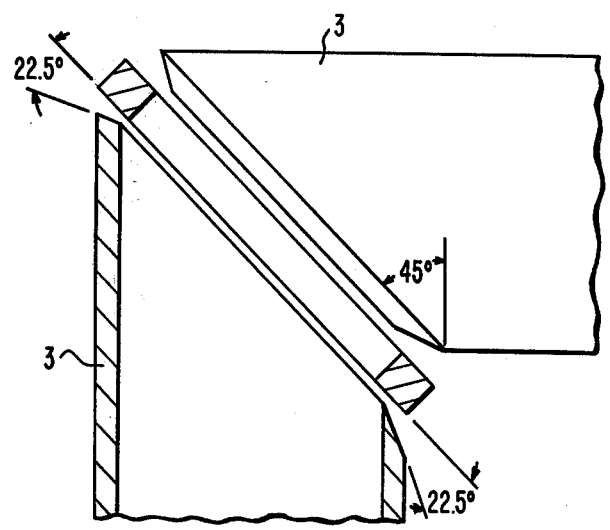
FIG. 3 is an elevational view partially in section of pipe sections being joined to form a mitred joint and having constant angle bevels which are automatically cut by flame cutting apparatus such as shown in FIGS. 1 and 2.

As can be seen in FIG. 3, in order to cut a constant angle bevel, the angular orientation of the torch varies appreciably from the low point to the high point on the mitre and the amount of steel being cut also varies. Since there are no automatic provisions available for changing the quantity of oxygen being fed to the cutting torch, the turntable 5 automatically changes speed to keep the rate of cut uniform. The variation in the thickness of the cut can best be shown by an example. Assume it is desired to cut a three-quarter inch thick pipe. During that portion of the cut when the torch is adjacent the upper portion of the mitre, the torch is cutting through approximately one inch of steel; and when the torch is cutting through that portion of the pipe adjacent the lower portion of the mitre, the torch is cutting through approximately two and one-half inches of steel.

The probe 29 contacts the inner wall of the pipe during the bevel cutting mode of operation and the outer surface of the pipe during the mitre cutting mode of operation. The probe 29 sends a signal to move the boom 9 and therefore the torch 11 in or out to maintain a generally constant distance between the torch 11 and the pipe 3, compensating for out-of-roundness or deviation in the concentricity and wall thickness of the pipe.

The equipment hereinbefore described may be utilized for cutting pipe so that it has a mitre and a constant angle bevel on that mitre cut for the purpose of subsequently welding two pieces of pipe together to form a 90° or 45° corner, depending on the desired joint. This embodiment is capable of handling two mitres 45° or 22½° for 90° or 45° corners, respectively, and 22½° bevels or 30° bevels. However, the same principle may be utilized to cut any mitre angle and any constant bevel on that mitred cut, thus providing an automatic cutting torch that cuts an accurate mitre which has constant angle bevels to facilitate high quality welds when two such pieces of pipe are joined to form a corner or bend.

What is claimed is:

1. Automatic flame-cutting apparatus for producing on pipe, mitres having a constant angle bevel, said apparatus comprising:

a turntable disposed to rotate at varying speeds about a generally vertical axis and having an imaginary plane generally disposed perpendicular to the axis of rotation;

means for clamping said pipe on said turntable so that said pipe is disposed with its longitudinal axis generally coaxial with the axis of rotation of said turntable;

a boom synchronized with the rotation of said turntable and having an imaginary line disposed thereon generally parallel to said imaginary plane on said turntable, the synchronization being such that the distance between the imaginary line on said boom and the imaginary plane on said turntable varies in such a manner as to provide a predetermined distance therebetween for each angular position of the turntable;

a cutting torch mounted on an arcuate slide attached to said boom, the cutting torch being generally fixed relative to the boom and outside the pipe to cut a uniform mitre on said pipe in a first mode of operation, and the cutting torch being movably mounted inside the pipe to follow the arcuate slide in a second mode of operation, the arcuate position of the torch being synchronized with the angular position of the turntable in the second mode of operation whereby a bevel forming a constant angle with respect to an imaginary plane through the edge of a mitred cut on the pipe will be automatically produced utilizing said apparatus; and, a probe which contacts the inside of the pipe when the apparatus is operating in the second mode to maintain a predetermined distance between the cutting torch and the inner surface of the pipe.

* * * * *